United States Patent [19]

Smith

[11] Patent Number: 4,802,699

[45] Date of Patent: Feb. 7, 1989

[54] SNAP LOCK ASSEMBLY

[75] Inventor: Gary I. Smith, Auburn, Ind.

[73] Assignee: Brammall, Inc., Angola, Ind.

[21] Appl. No.: 202,312

[22] Filed: Jun. 6, 1988

[51] Int. Cl.⁴ ............................................. B05D 33/34
[52] U.S. Cl. ..................................... 292/327; 292/324
[58] Field of Search ............. 292/318, 324, 327, 256.6

[56] References Cited

U.S. PATENT DOCUMENTS

| | | | |
|---|---|---|---|
| 3,951,443 | 4/1976 | Barnaby | 292/327 |
| 3,975,040 | 8/1976 | Van Gompel | 292/318 |
| 4,280,726 | 7/1981 | McCoag | 292/327 |
| 4,418,952 | 12/1983 | Wallet | 292/327 |
| 4,626,009 | 12/1986 | Burnette et al. | 292/327 |

Primary Examiner—Richard E. Moore
Attorney, Agent, or Firm—Hill, Van Santen, Steadman & Simpson

[57] ABSTRACT

A snap lock assembly that comprises a bolt or a cable which can be extended through hasps and which has a locking portion formed with a plurality of parallel spaced grooves that are receivable in a cylindrical member that has a plurality of snap rings spaced therein at distances which correspond to the distance between the grooves so that the seal can be locked in a number of positions as the bolt is moved into the cylindrical member, but the bolt cannot be removed from the cylindrical member due to the camming action of the cylindrical member on the plurality of snap rings in the grooves.

3 Claims, 1 Drawing Sheet

U.S. Patent    Feb. 7, 1989    4,802,699
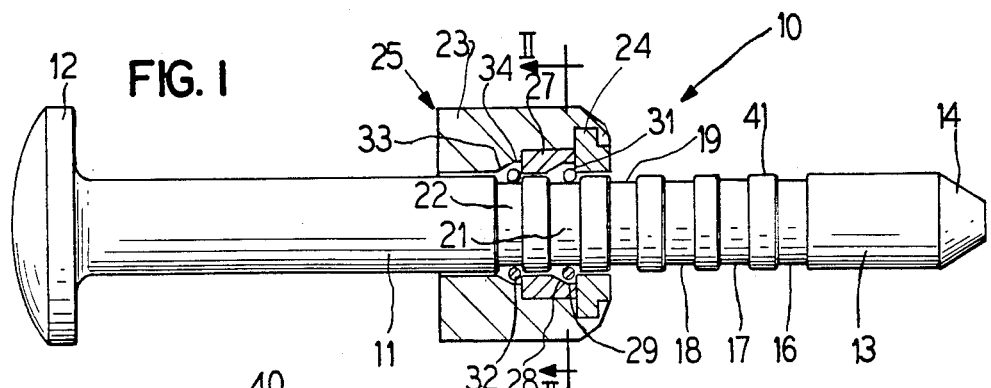
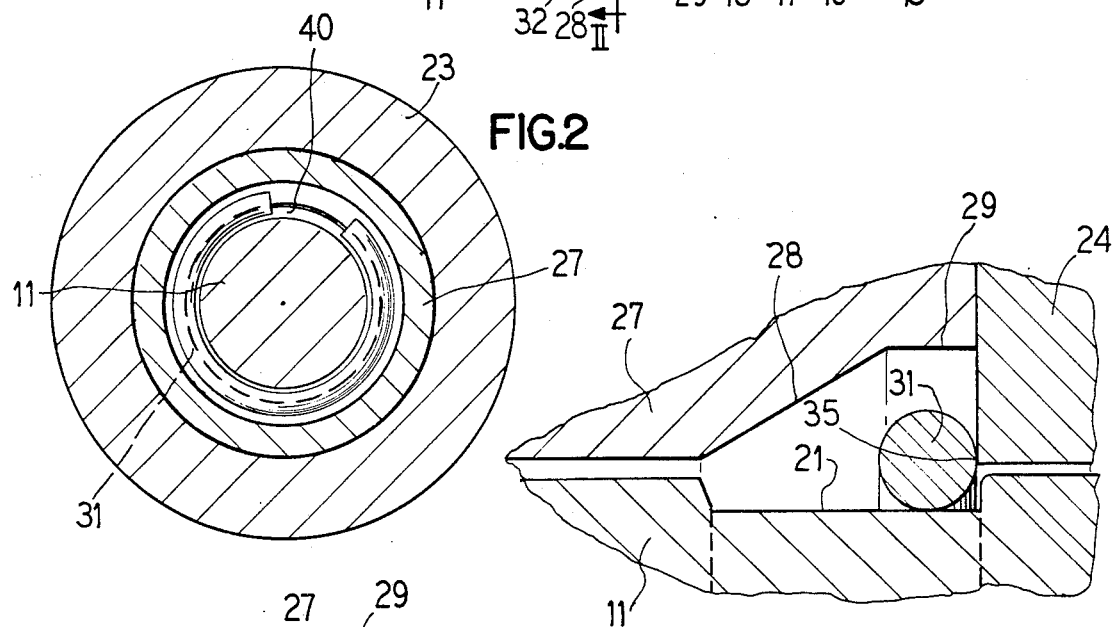
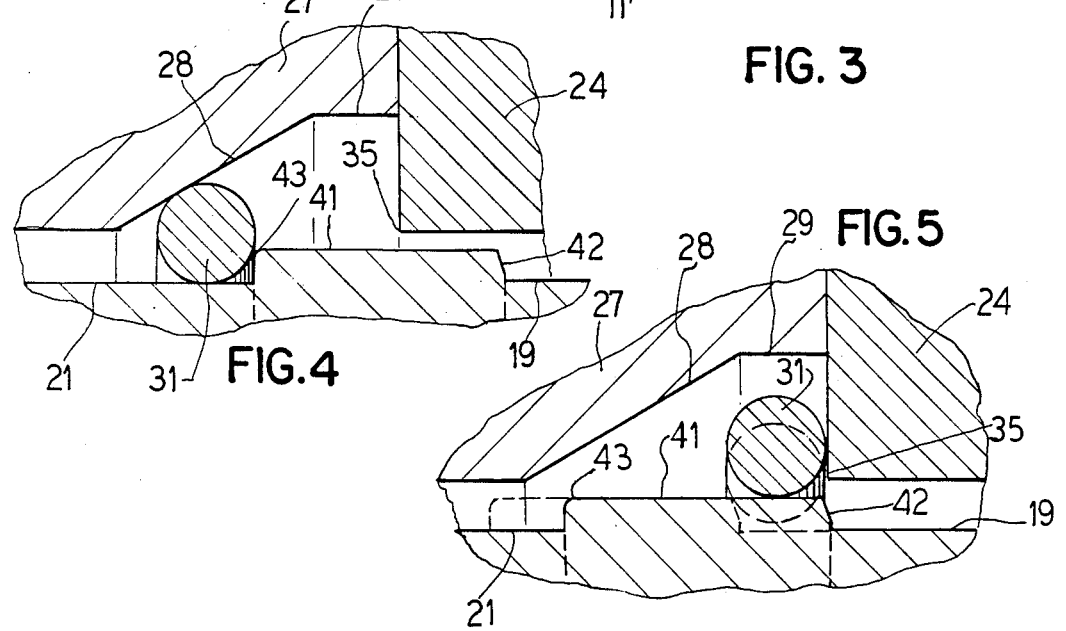

SNAP LOCK ASSEMBLY

BACKGROUND OF THE INVENTION

Field of the Invention

This invention relates in general to snap ring seals and in particular to a novel snap ring seal.

Description of the Prior Art

U. S. Pat. No. 3,975,040 discloses a snap ring seal comprising a bolt formed with a plurality of grooves with fixed spacings between them and a locking portion formed with snap rings which are spaced distances different from the grooves in the bolt. In the structure of U.S. Pat. No. 3,975,040, only a single snap ring provides locking of the bolt and locking member.

SUMMARY OF THE INVENTION

The present invention provides a bolt seal which has a bolt with a plurality of parallel spaced grooves and a cylindrical snap locking body which fits over the bolt and includes two or more locking snap rings which are receivable in two or more of the grooves of the bolt to lock the snap locking body to the bolt. The snap locking body is formed with mating tapered portions above each of the snap rings so that in a first direction of movement between the bolt and the snap lock body, the bolt can be moved through the snap lock body, but in a second direction of movement wherein the bolt is being moved out of the snap lock body, the tapered portions force the snap rings down into the grooves so that the snap rings will not allow the bolt to move out of the grooves.

It is an object of the present invention to provide an improved snap lock seal.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a side partially sectional view of the bolt seal of the invention;

FIG. 2 is a sectional view on line II—II of FIG. 1;

FIG. 3 is an enlarged sectional view showing the locking ring in a groove the bolt seal;

FIG. 4 is an enlarged sectional view showing how the locking ring prevents the bolt from being withdrawn from the snap lock body; and FIG. 5 illustrates in an enlarged sectional view how the bolt can be moved through the snap lock body in one direction.

DESCRIPTION OF THE PREFERRED EMBODIMENTS

FIG. 1 illustrates the bolt seal 10 of the invention comprising a bolt which has a shank 11 with a head 12 and an outer end 13 which has a tapered portion 14. A plurality of equally spaced grooves 16, 17, 18, 19, 21 and 22 are formed in the shank 11 of the bolt as shown. A snap lock body 25 comprises a first cylindrical main body member 23 and contains an inner cylindrical member 27 and an end cylindrical member 24. A pair of snap rings 31 and 32 of generally circular cross-section are mounted in the snap lock body 25 and the dimensions are such that they will not fall out of body 25.

The tapered end 14 is inserted into the snap lock body 25 and the lock rings 31 and 32 are as shown in FIG. 2 formed with an opening 40 such that as the tapered end 14 of the bolt is inserted through the snap lock body 25, the snap rings will increase in diameter and will ride up on the portion 13. When the first snap ring 32 falls into the first groove 16 as the bolt 11 is pushed toward the right relative to FIG. 1 relative to the snap lock body 25, the square corner 35 of the member 24 will push the snap ring 31 up the inclined surface 42 of the front portion 41 between adjacent grooves. The portion 42 is inclined at about a 70° angle from the horizontal and the enlarged portion 29 in the member 27 allows the snap ring 31 to expand and move onto the larger diameter portion 41 between the grooves as shown in FIG. 5. The dotted position in FIG. 5 shows the snap ring 31 being forced up the tapered surface 42 of the groove onto the surface 41. The back edge 43 of the portion 41 is formed with a small radius as shown.

FIG. 4 illustrates the snap ring in a position when an attempt is made to pull the bolt 11 from the snap lock body 25 by pulling it to the left relative to the snap lock body. When this occurs, a tapered portion 28 of the member 27 will force the snap ring 31 down into the groove 21 and will prevent the snap ring 31 from riding up onto the top portion 41. The taper of the portion 28 of the member 27 is such that force is exerted so that it is in a direction behind relative to FIG. 4, the upper corner 43 of the groove 21. In other words, the tapered surface 28 pushes down on the snap ring 31 and the snap ring cannot ride up onto the top surface 41 of the groove.

It is to be noted relative to FIG. 1 that the member 23 has a tapered portion 33 and a flat portion 34 which cooperates with the snap ring 32. The portion 33 is tapered and cooperates with the snap ring 32 and an enlarged portion 34 is formed adjacent to the tapered portion 33. Thus, the tapered portion 33 performs the same function with the snap ring 32 that the tapered portion 28 performs with the snap ring 31.

It is seen that this invention provides a snap lock assembly which allows a bolt to be moved in the first direction into a locking position with a snap lock body such that the snap lock body cannot be removed from the bolt but that the bolt can be extended further into the snap lock body.

Although the invention has been described with respect to preferred, it is not to be so limited as changes and modifications may be made therein which are within the full intended scope as defined by the appended claims.

I claim as my invention:

1. A snap lock seal comprising, a bolt with a shank in which a plurality of equidistant spaced grooves are formed, a locking member formed with a central opening through which said bolt shank can be inserted, a plurality of snap rings with substantially circular cross-sections mounted in said locking member so as to be spaced apart the same distance as the spacings of said grooves in said shanks and adapted to be received in said grooves to lock said locking member to said shank, each of said plurality of grooves formed with forward end walls which are substantially normal to the longitudinal axis of said bolt shank and each of said plurality of grooves formed with back end walls which have angles less than 90° to the longitudinal axis of said bolt shank, and said locking member formed with a plurality of snap ring sockets in which said plurality of snap rings are received and each of sockets formed with walls which are substantially normal to the longitudinal axis of said bolt shank, and each of said sockets formed with rear walls which are tapered relative to the longitudinal axis of said bolt shank such that if force is applied to remove said bolt from said locking member, the rear tapered wall of each of said sockets will press one of said plurality of snap rings downwardly into said plurality of grooves to prevent said bolt from being removed from said locking member.

2. A snap ring according to claim 1 wherein rear tapered wall of each of said sockets is tapered about 30° relative to the longitudinal axis of said bolt shank.

3. A snap ring according to claim 1 wherein said back end walls have angles of about 70° relative to said longitudinal axis of said bolt shank.

* * * * *